United States Patent
West (10) Patent No.: US 9,619,838 B1
(45) Date of Patent: *Apr. 11, 2017

(54) SYSTEMS AND METHODS FOR DISPLAYING CURRENT CONSUMER CARD STATUS ON A WIRELESS DEVICE

(71) Applicant: United Services Automobile Association (USAA), San Antonio, TX (US)

(72) Inventor: Billie J. West, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/340,854

(22) Filed: Jul. 25, 2014

Related U.S. Application Data (63) Continuation of application No. 12/208,612, filed on Sep. 11, 2008, now Pat. No. 8,820,632.

(51) Int. Cl.
*G07F 19/00* (2006.01)
*G06Q 40/00* (2012.01)

(52) U.S. Cl.
CPC .................................. *G06Q 40/00* (2013.01)

(58) Field of Classification Search
USPC ........ 235/379, 380; 705/39; 455/407, 412.2, 455/558, 41.2
See application file for complete search history.

(56) References Cited

U.S. PATENT DOCUMENTS

| | | | |
|---|---|---|---|
| 3,719,927 A | 3/1973 | Michels et al. | |
| 3,956,615 A | 5/1976 | Anderson et al. | |
| 5,208,446 A | 5/1993 | Martinez | |
| 5,664,110 A | 9/1997 | Green et al. | |
| 5,857,156 A | 1/1999 | Anderson | |
| 6,105,007 A | 8/2000 | Norris | |
| 6,286,756 B1 | 9/2001 | Stinson et al. | |
| 6,714,797 B1 | 3/2004 | Rautila | |
| 7,130,612 B1 | 10/2006 | Blewett et al. | |
| 7,175,073 B2 | 2/2007 | Kelley et al. | |
| 7,350,230 B2 | 3/2008 | Forrest | |
| 7,418,427 B1 | 8/2008 | Drummond et al. | |
| 7,445,144 B2 | 11/2008 | Schlabach et al. | |
| 7,472,081 B1 | 12/2008 | Cason | |
| 7,555,461 B1 | 6/2009 | Drummond et al. | |
| 7,588,183 B2 | 9/2009 | Shane et al. | |
| 7,611,049 B2 | 11/2009 | Drummond et al. | |
| 8,820,632 B1 * | 9/2014 | West ...................... | G06Q 40/02 235/379 |

(Continued)

OTHER PUBLICATIONS

Nokia 6822 User Guide, www.nokia.com, 2008, pp. 1-99.

*Primary Examiner* — Michael G Lee
*Assistant Examiner* — Tabitha Chedekel
(74) *Attorney, Agent, or Firm* — Fish & Richardson P.C.

(57) ABSTRACT

A system for object tracking may comprise a system for displaying consumer account information on a wireless device comprising at least one subsystem that receives transaction information regarding a purchase of the consumer, at least one subsystem that sends selected transaction information regarding the transaction to a wireless device, and at least one subsystem that displays on the wireless device account information based on the sent selected transaction information.

18 Claims, 11 Drawing Sheets

(56) References Cited

U.S. PATENT DOCUMENTS

| | | |
|---|---|---|
| 2002/0161701 A1 | 10/2002 | Warmack |
| 2002/0194502 A1 | 12/2002 | Sheth et al. |
| 2003/0009402 A1 | 1/2003 | Mullen et al. |
| 2006/0196931 A1 | 9/2006 | Holtmanns et al. |
| 2007/0149252 A1 | 6/2007 | Jobs et al. |
| 2007/0298764 A1 | 12/2007 | Clayton |
| 2008/0167017 A1 | 7/2008 | Wentker et al. |

* cited by examiner

SYSTEMS AND METHODS FOR DISPLAYING CURRENT CONSUMER CARD STATUS ON A WIRELESS DEVICE

CLAIM OF PRIORITY

This application is a continuation of and claims priority under 35 U.S.C. §120 to U.S. patent application Ser. No. 12/208,612, filed on Sep. 11, 2008, the entire contents of which is hereby incorporated by reference. The patent applications below (including the present patent application) share a common title and disclosure, each of which is hereby incorporated by reference in its entirety:

U.S. patent application Ser. No. 12/208,620, filed on Sep. 11, 2008, now abandoned; and U.S. patent application Ser. No. 12/208,624, filed on Sep. 11, 2008, now abandoned.

BACKGROUND

It often occurs that people who use credit cards do not know their credit limit, or even if they do know their credit limit they may not know at any given moment how close their current balance on their credit card is to their limit or if they have gone over their limit. This often results in extra fees for going over their credit limit and overuse of the credit card. It may also be difficult for credit card users to control spending without a constant reminder of what their credit balance is. This may result in defaults on the credit card, bankruptcy and a bad credit history for the credit card holder.

In this regard, there is a need for systems and methods that overcome shortcomings of the prior art.

SUMMARY

This summary is provided to introduce a selection of concepts in a simplified form that are further described, below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for displaying current consumer card status on a wireless device are provided. For several embodiments, a system for displaying current consumer card status on a wireless device may comprise a system for displaying consumer account information on a wireless device comprising at least one subsystem that receives transaction information regarding a purchase of the consumer, at least one subsystem that sends selected transaction information regarding the transaction to a wireless device, and at least one subsystem that displays on the wireless device account information based on the sent selected transaction information.

Other advantages and features are described below.

BRIEF DESCRIPTION OF THE DRAWINGS

Systems and methods for displaying current consumer card status on a wireless device are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
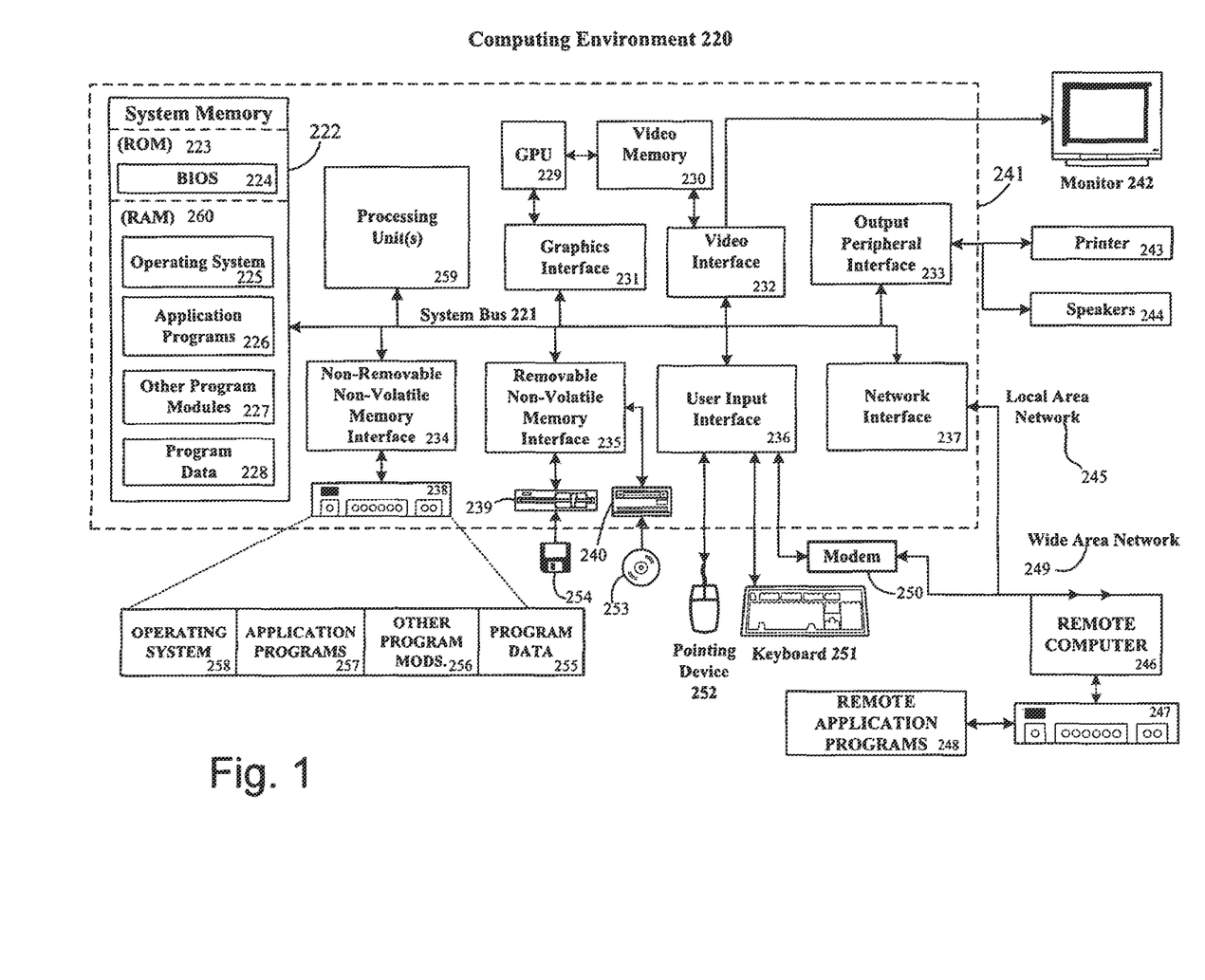
FIG. 1 is a block diagram representing an exemplary computing device suitable for use in conjunction with implementing systems and methods for displaying current consumer card status on a wireless device.

Referring next to FIG. 1, shown is a block diagram representing an exemplary computing device suitable for use in conjunction with implementing the processes described below. For example, the computer-executable instructions that carry out the processes and methods for displaying current consumer card status on a wireless device may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, and a system bus 221 that couples various system components including the system memory 222 to the processing unit 259, graphics processing unit (GPU) 229 and video memory 230. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the memory storage device 247. By way of example, and not limitation, FIG. 1 illustrates remote application programs 248 as residing on memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
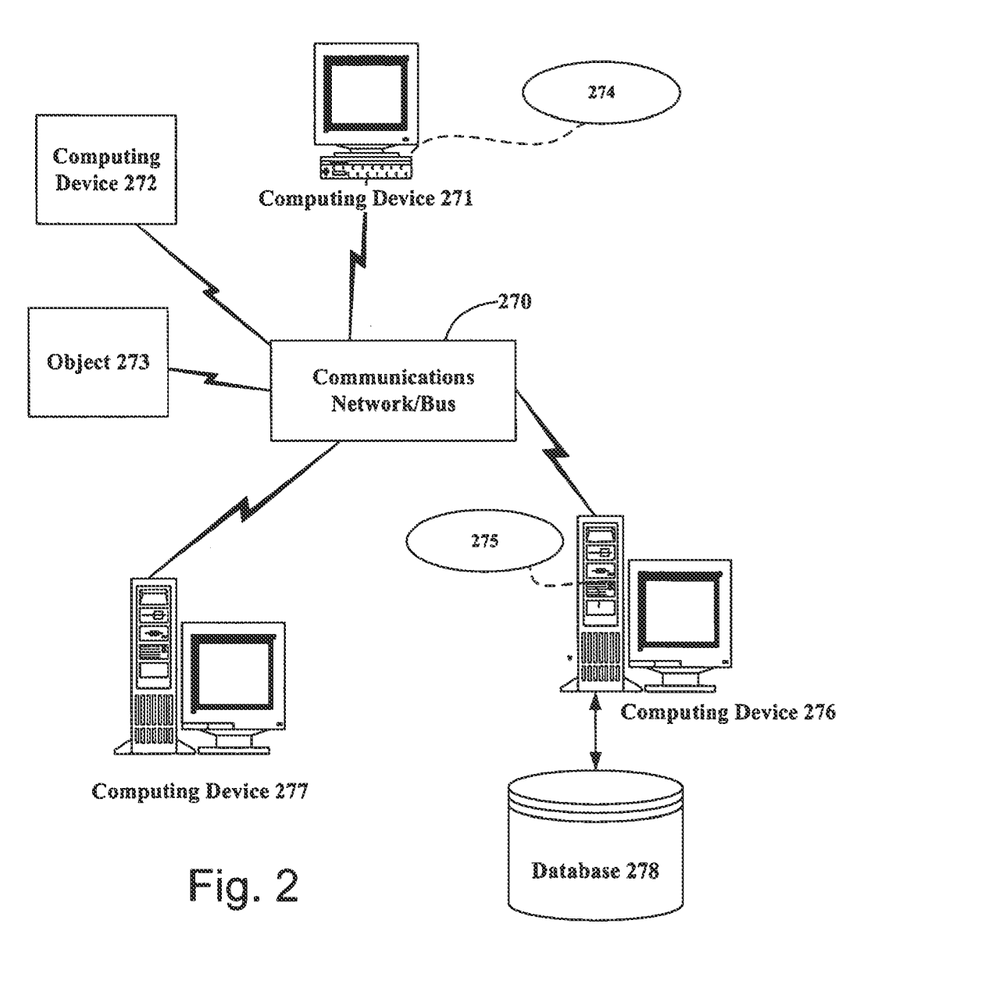
FIG. 2 illustrates an exemplary networked computing environment in which many computerized processes may be implemented to perform displaying current consumer card status on a wireless device.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing systems and methods for displaying current consumer card status on a wireless device. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
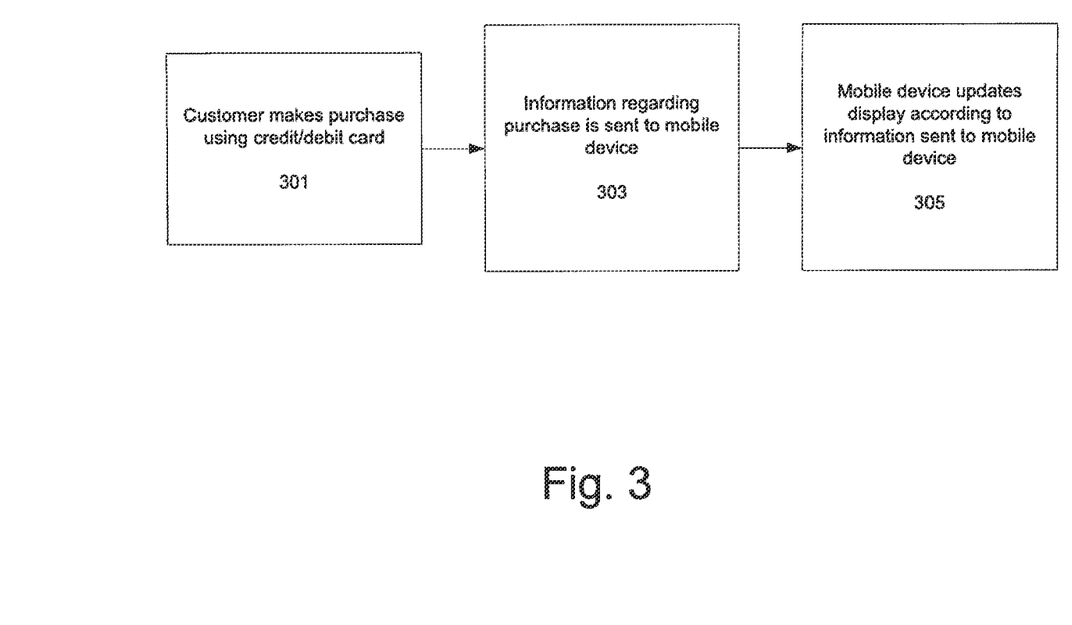
FIG. 3 is a flow chart illustrating an example process for displaying current consumer card status on a wireless device.

Referring next to FIG. 3, shown is a flow chart illustrating an example process for displaying current consumer card status on a wireless device. After a customer makes a purchase using (301) a consumer card, information regarding the purchase is sent (303) to the customer's wireless device. For the purposes described herein, using a consumer card means using either a physical debit or credit card to complete the purchase or using a credit or debit card account number or other account information to complete the purchase, regardless of whether a physical card is present or involved in the transaction. The information sent to the wireless device may be made over a wireless or other communication channel. The wireless device to which the information is sent may be, but is not limited to, one or a combination of following types of devices: cellular phone, smart phone, personal digital assistant, handheld computing device, notebook computer, satellite communication enabled device, long range radio communication enabled device, short range radio enabled device, BlueTooth™ enabled device, Wireless Fidelity (WiFi) communication enabled device, ultrasonic communication enabled device, infrared communication enabled device, radio frequency identification (RFID) communication enabled device, etc.

The information sent to the wireless device may be, but is not limited to, one or more (or a combination) of the following types of information: transaction information, transaction identification information, time and/or date of transaction, transaction amount, merchant name, merchant category, goods or services bought or returned, identification information regarding goods or services bought or returned, type of goods or services bought or returned, category of goods or services bought or returned, account balance, account identification information, account number, name on account, credit limit, whether a credit limit has been reached, credit limit increase notification, notice and/or reason for a transaction decline, advertising information, offer for credit increase, aggregated information on multiple consumer accounts, aggregated information on multiple transactions, etc.

The information is sent to the wireless device in a relatively short time from the time of the transaction or purchase in order for the customer and the wireless device to have the most current information as possible. The information may be sent in real time to the wireless device immediately after the transaction is completed. Once the wireless device receives the sent information, the wireless device updates (305) a display on the wireless device based on information sent to the wireless device. For example, the display may be updated by the wireless device presenting on the display a graphical, audio and/or textual representation of one or more of, or a combination of, but not limited to, the following pieces of information or presentations: general account information, a current account balance relative to a credit limit of the account, a color-coded graphical indication representing a current account balance relative to a credit limit of the account, a graphical dial indicating a current account balance relative to a credit limit of the account, a current balance of the account, a current credit limit of the account, a current account balance relative to budget limits set by a user of the wireless device, a current account balance relative to budget limits set by a user of the account and/or wireless device, a graph showing a current account balance relative to a credit limit of the account, a chart showing a current account balance relative to a credit limit of the account, a graph or chart showing a current account balance relative to budget limits set by a user of the account and/or wireless device, total purchases broken down by category, total purchases broken down by category relative to budgeted amounts corresponding to one or more of the categories, one or more of the foregoing pieces of information or presentations concerning aggregated information from multiple accounts, etc. For example, regarding the foregoing pieces of information or presentations concerning aggregated information from multiple accounts, the display may be updated to show (either together or separately), a chart graph or warning of how close a user of the wireless device is to exceeding their credit limits for a number of different accounts. As another example, the display may be updated to show a graph, chart or other indication of total purchases over a specific time period (e.g., a month) across a number of different accounts relative to a budgeted amount for that specific time period. Such a display may also be broken down by spending category or budget category, for example.

Figure 4:
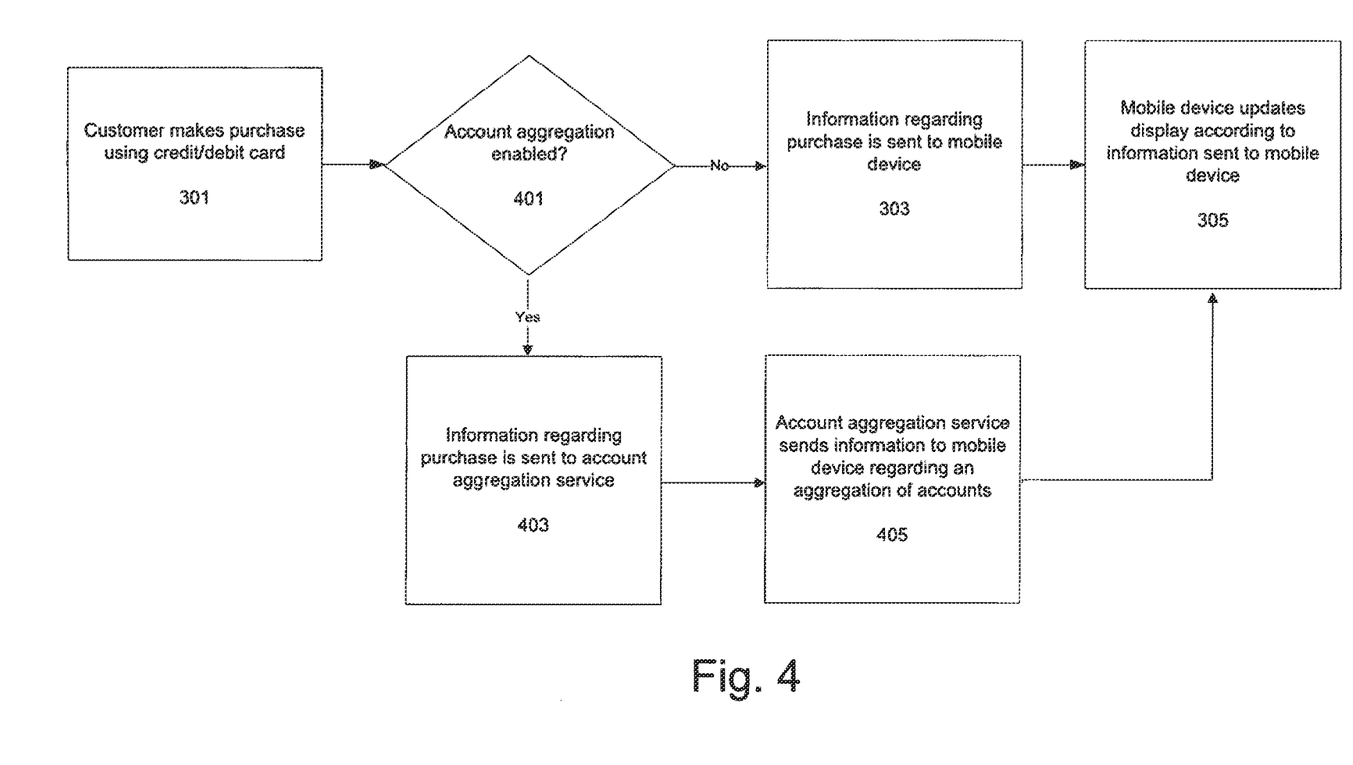
FIG. 4 is a flow chart illustrating an example process for displaying current consumer card status on a wireless device for multiple card accounts.

Referring next to FIG. 4, shown is a flow chart illustrating an example process for displaying current consumer card status on a wireless device for multiple card accounts. After a customer makes a purchase using (301) a consumer card, a determination may be made (401) whether account aggregation has been enabled. This enablement of account aggregation may, for example, have been the result of a user indicating multiple accounts for which the user desires to receive information displayed on a wireless device. This enablement of account aggregation may also be in an automated fashion as a result of a general indication made by a user that the user desires to have such aggregation service enabled. If account aggregation has been enabled, then information regarding the purchase is sent (403) to an account aggregation service. The account aggregation service may be a part of or separate from the card company, card issuing bank, or other financial services company used by the customer. The account aggregation service then sends (405) information to a wireless device (e.g., the customer's wireless device) regarding an aggregation of customer accounts. This aggregation may be of multiple types of accounts including, but not limited to one or more of: credit card, debit card, checking, savings, investment, insurance, retirement, trading, etc.

If account aggregation has not been enabled, then information regarding the purchase is sent (303) to the wireless device in similar fashion to that described above, for example. The wireless device may then update (305) a display of the wireless device based on the information sent to the wireless device in a similar fashion described above.

Figure 5:
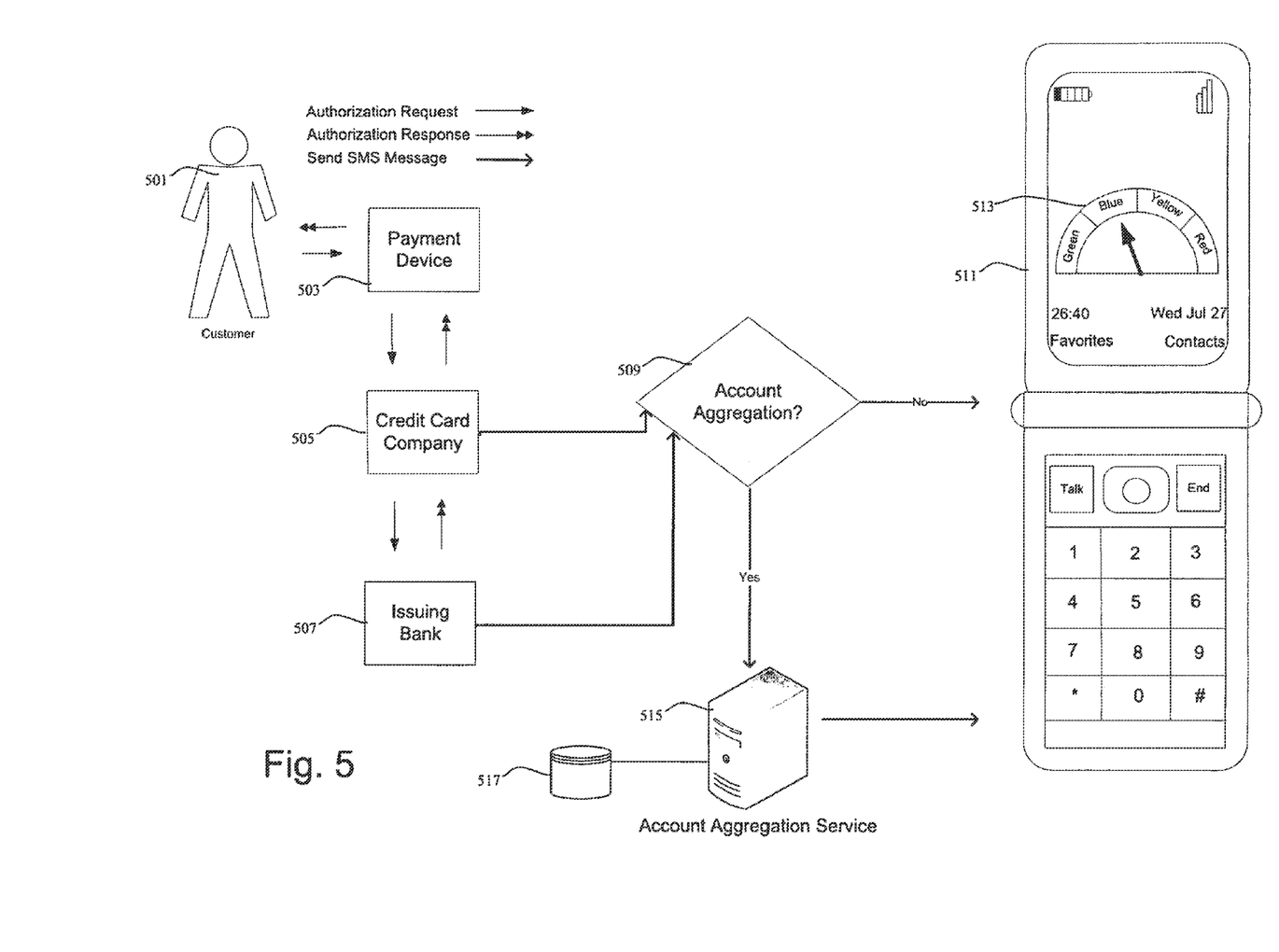
FIG. 5 is a block diagram illustrating an example system for displaying current consumer card status on a wireless device.

Referring next to FIG. 5, shown is a block diagram illustrating an example system for displaying current consumer card status on a wireless device. The example system shown in FIG. 5 is one in which the processes described above may be implemented; however, other suitable variations and systems are contemplated (including those having more, less or different components) and may also be used to accomplish the same or equivalent purposes. Shown is an example customer 501, an example payment device 503, an example credit card company 505, an example issuing bank 507, a determination point of whether account aggregation is to be used 509, an account aggregation service 515 and associated database 517, an example wireless device 511, and an example graphical indication of current account balance relative to a credit limit 513. Also shown are differently shaped arrows representing either an authorization request, authorization response, or sending of a short message service (SMS) message (although other types of messaging or communication channels may be utilized).

The customer may make a purchase with their consumer card through a payment device 503. The payment device 503 may be any device or system which the customer 501 or merchant uses to communicate transaction information to the credit card company 505. For example, an authorization request for a credit card transaction may be made through a payment device at a merchant where the customer 501 is making a purchase. Also, the payment device 503 may be any system that processes a consumer card transaction of the customer 501 using the consumer card number or other account information of the customer 501 originating from a merchant. The credit card company 505 then communicates the authorization request to the issuing bank 507, for example. The issuing bank 507 may be the bank that issued the consumer card to the customer 501. Once the issuing bank 507 receives the authorization request, an authorization response approving or declining the transaction may be sent back to the payment device 503. It is then determined at a point of determination 509 whether account aggregation is enabled. If account aggregation is enabled, a message is sent to an account aggregation service 515 to collect information on other accounts of the customer 501, such as, for example, current account balance, current transaction(s) amounts, etc. If account aggregation is not enabled, the message is not sent to an account aggregation service. This information may be stored in a database 517 of the account aggregation service 515. A message (e.g., an SMS message) is then sent to the wireless device 511 from the account aggregation service 515 and/or the credit card company 505 and/or the issuing bank 507 containing information (e.g., the transaction amount, transaction category, etc.) regarding the transaction. The wireless device then updates the display of the wireless device to show account information based on the received message. For example, the wireless device may keep a running total of the account balance (or account balances) based on the received message containing the transaction amount and display an graphical indication 513 of the account balance(s) relative to a current credit limit of the account(s).

Figure 6:
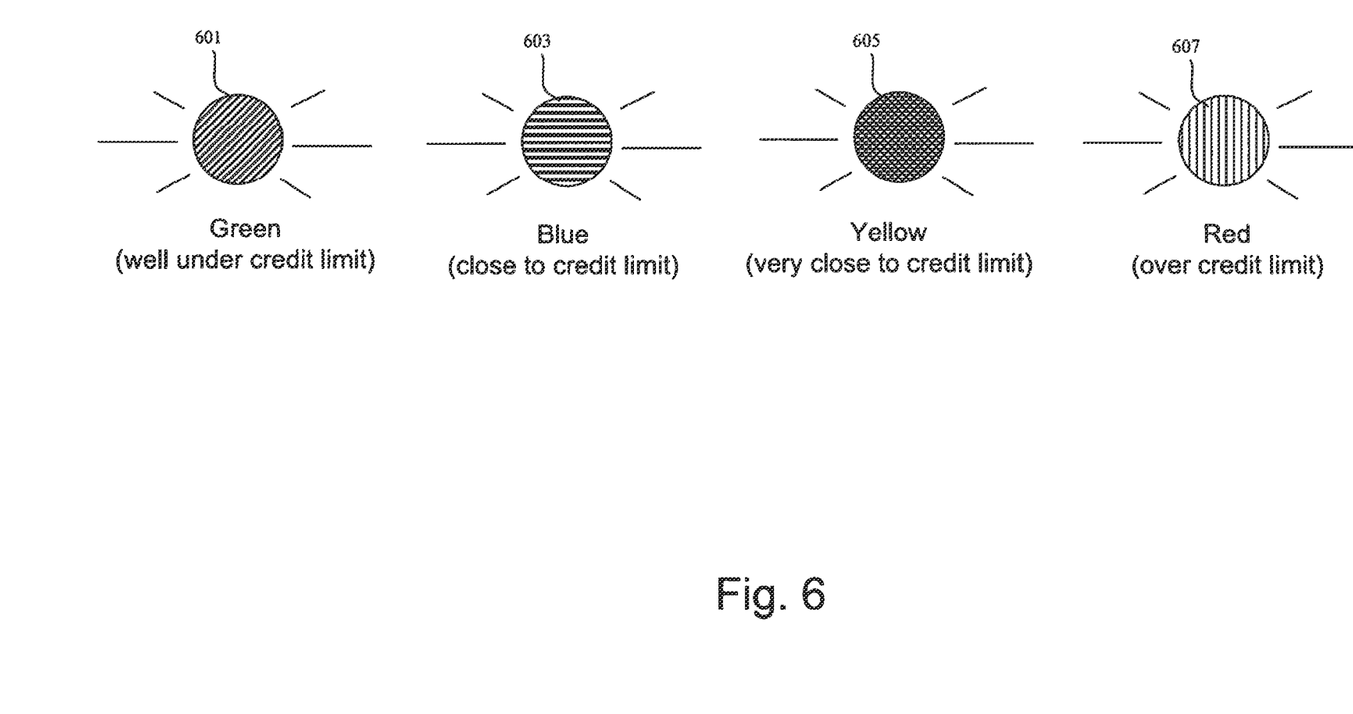
FIG. 6 is a diagram illustrating example indicators that may be used in displaying current consumer card status on a wireless device.

Referring next to FIG. 6, shown is a diagram illustrating example indicators that may be used in displaying current consumer card status on a wireless device. For example, shown are four different colored indicators 601, 603, 605, 607 represented by four different patterns. Each indicator represents a different level of current account balance relative to a credit limit. The green indicator 601 represents that the current balance is well under the credit limit, the blue indicator 603 represents that the account balance is close to the credit limit, the yellow indicator 605 represents the account balance is very close to the credit limit and the red indicator 607 represents the account balance is over the credit limit. Other colors, symbols and graphical indicators may also be used to communicate to a consumer via the graphical display of a wireless device account balance information relative to a credit limit.

Figure 7:
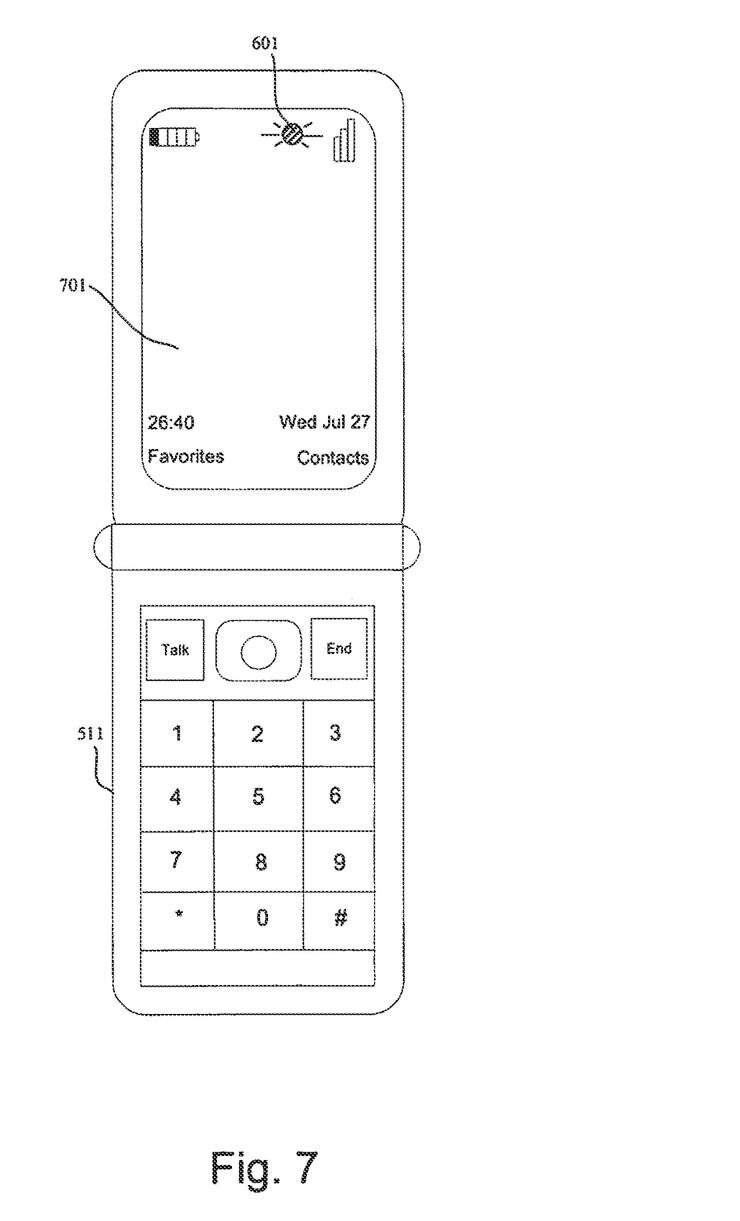
FIG. 7 is a front view of an example cell phone displaying an example indicator that may be used in displaying current consumer card status on a wireless device.

Referring next to FIG. 7, shown is a front view of a wireless device 511 in the form of an example cell phone displaying an example indicator 601 that may be used in displaying current consumer card status on a wireless device. Shown on the display 701 of the wireless device 511 is a graphical indicator such as that of FIG. 6. The graphical indicator 601 in the example of FIG. 7 is displayed near the top of the display 701 along with other indicators of status of the wireless device 511. For example, the indicator 601 is colored green to show the account balance is well under a current credit limit of a user of the wireless device 511.

Figure 8:
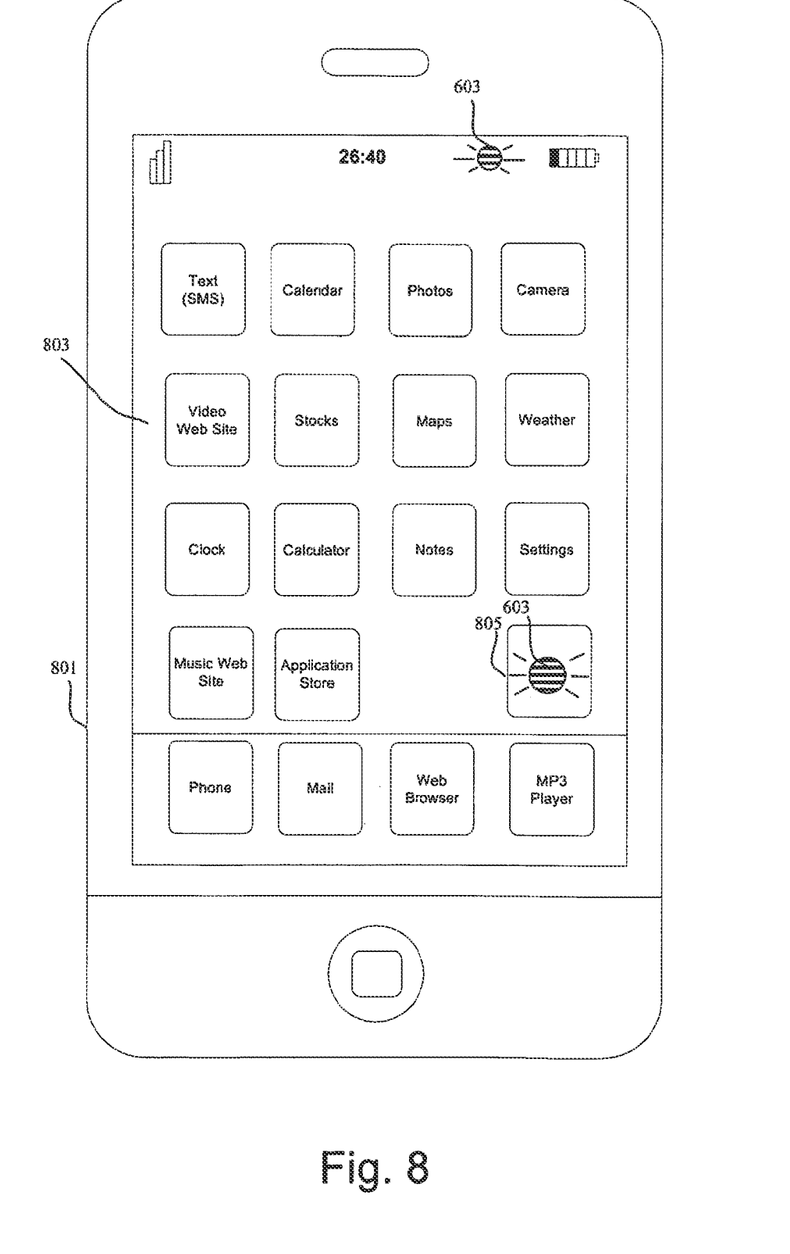
FIG. 8 is a front view of an example handheld wireless computing device displaying an example indicator that may be used in displaying current consumer card status on a wireless device.

Referring next to FIG. 8, shown is a front view of an example handheld wireless computing device displaying an example indicator that may be used in displaying current consumer card status on a wireless device. Shown is the wireless device 801 and the wireless device desktop display 803 containing various items and/or icons, one of which is a graphical indicator 805. The graphical indicator 805 may have an image 603 whose color indicates an account balance relative to a credit limit. For example, the image in FIG. 8 has a blue color to indicate the credit card account balance of the user of the wireless device 801 is close to the user's credit limit. Also, the user may click on or otherwise select the indicator 805 to retrieve additional information regarding the user's account(s), for example The image 603 may also appear on other areas of the display such as at the top of the device 801, for example.

Figure 9:
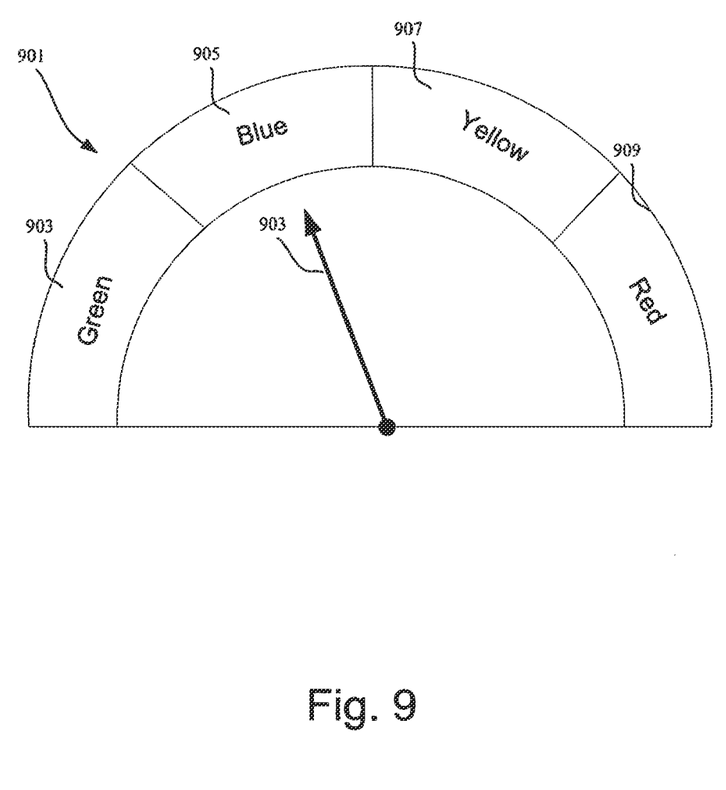
FIG. 9 is a diagram illustrating an example dial indicator that may be used in displaying current consumer card status on a wireless device.

Referring next to FIG. 9, shown is a diagram illustrating an example dial indicator that may be used in displaying current consumer card status on a wireless device. Shown is the dial indicator 901 wherein different positions or sections of the dial indicator 901 indicate different levels of account balance relative to a credit limit. For example, the green section 903 represents that the current balance is well under the credit limit, the blue section 905 represents that the account balance is close to the credit limit, the yellow section 907 represents that the account balance is very close to the credit limit and the red section 909 represents that the account balance is over the credit limit. The dial pointer 903 points to the appropriate section according to the current account balance. Additional or different levels, colors, and/or indications of account balance may also be used.

Figure 10:
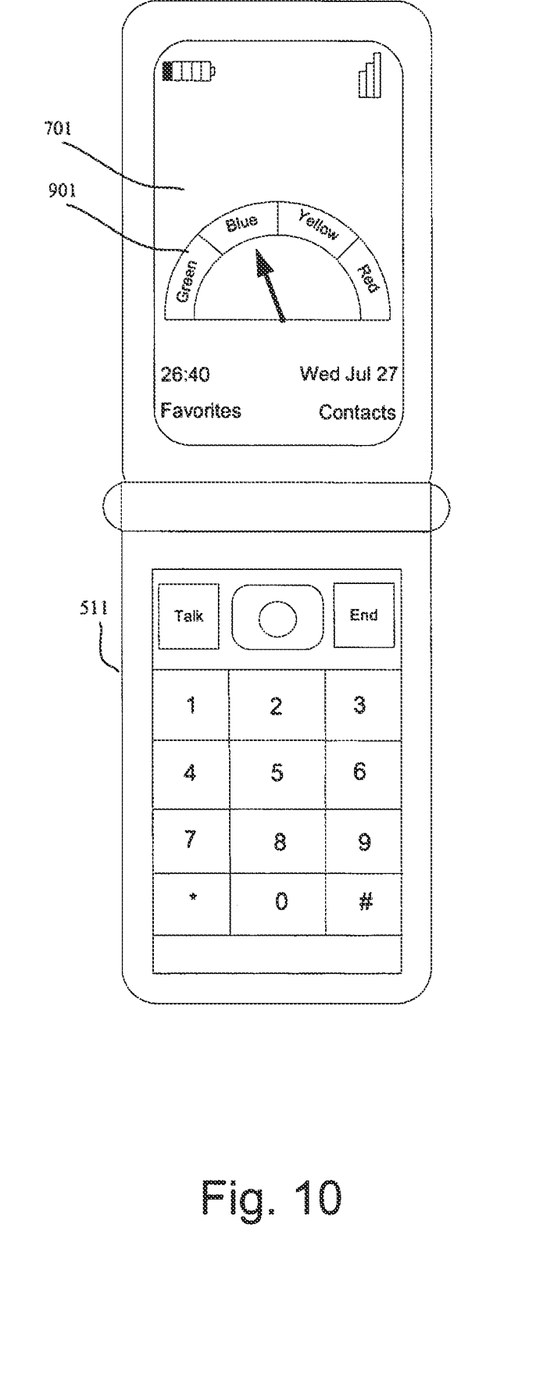
FIG. 10 is a front view of an example cell phone displaying an example dial indicator that may be used in displaying current consumer card status on a wireless device.

Referring next to FIG. 10, shown is a front view of an example cell phone displaying an example dial indicator that may be used in displaying current consumer card status on a wireless device. Shown is the example wireless device 511 having a display 701. On the display 701 is shown an example dial indicator 901 such as that shown in FIG. 9, for example indicating a current credit card account balance relative to a current credit limit. The dial indicator 901 may be part of the home screen, background or "wall paper" of the wireless device display 701 so that the user of the wireless device 511 may easily see the current information regarding their account at almost any time without having to select additional menu items or navigate through a user interface, for example.

Figure 11:
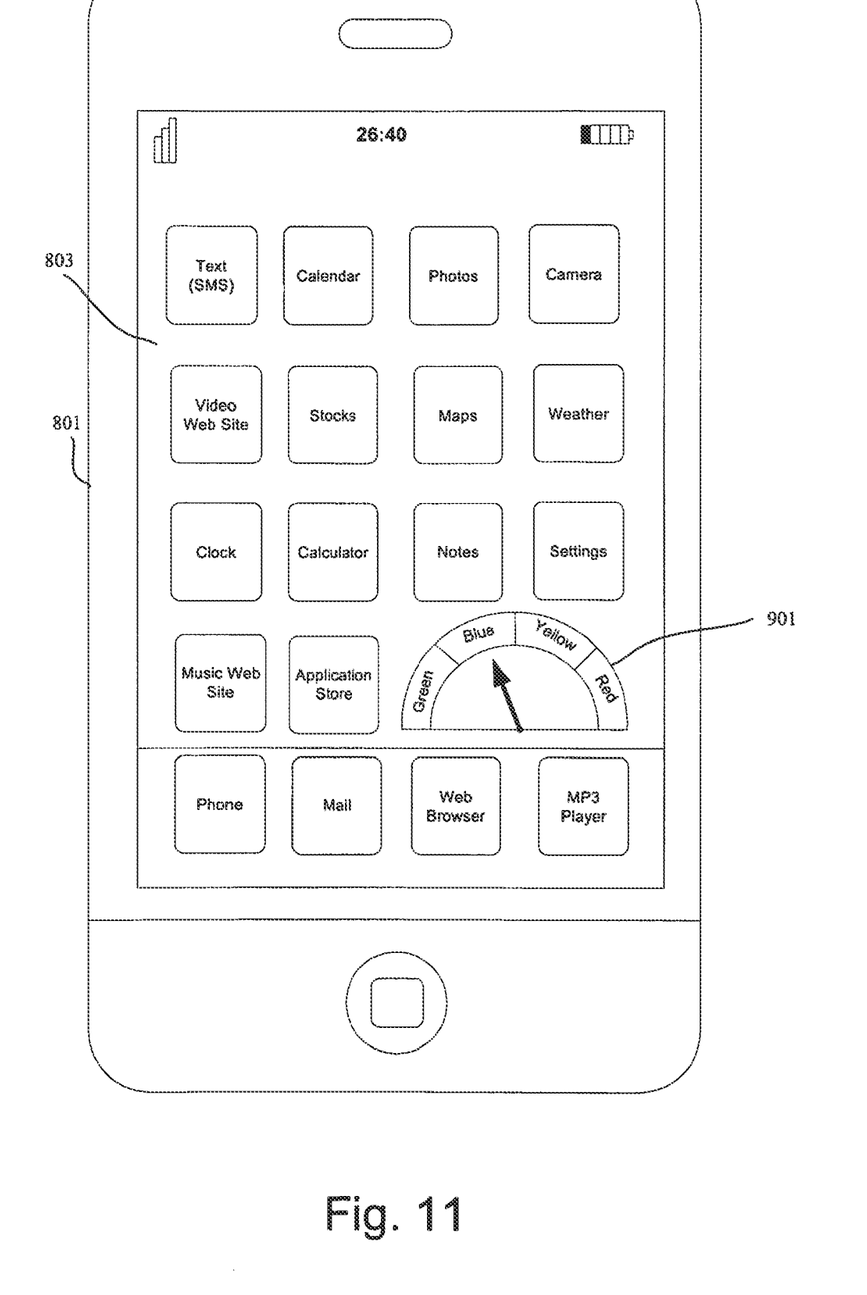
FIG. 11 is a front view of an example handheld wireless computing device displaying an example dial indicator that may be used in displaying current consumer card status on a wireless device.

Referring next to FIG. 11, shown is a front view of an example handheld wireless computing device displaying an example dial indicator that may be used in displaying current consumer card status on a wireless device. Shown is the wireless device 801 and the wireless device desktop display 803 containing various items and/or icons, one of which is a graphical dial indicator 901 such as that of FIG. 9, for example. The dial of the dial indicator 901 will move to the appropriate section of the dial indicator 901 according to a current credit card account balance as determined by the processes described above, for example, relative to a current credit limit. Also, the user may click on or otherwise select the dial indicator 901 to retrieve additional information regarding the user's account(s).

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A wireless device comprising:
 a display;
 one or more storage devices storing instructions that are operable, when executed by the one or more computers, to cause the wireless device to perform operations comprising:
  receiving transaction information regarding a purchase and aggregated account information for a number of accounts of the user of the wireless device;
  determining account information for each of the number of accounts based on the selected transaction information and the aggregated account information; and
  updating the display with account information for the number of accounts of the consumer on the wireless device based on the sent selected transaction information and the determined account information, the display utilizing a color-coded representation wherein a first color is used to represent a first proximity of each of the number of accounts to a credit or balance limit for each of the number of accounts and a second color is used to represent a second proximity of each of the number of accounts to the credit or balance limit for each of the number of accounts, wherein the second proximity is closer to the credit or balance limit for each of the number of accounts than the first proximity.

2. The wireless device of claim 1, wherein receiving transaction information receives the transaction information in an SMS message.

3. The wireless device of claim 1, wherein the account information includes aggregated account information and a current account balance and a credit limit of an account associated with the transaction information.

4. The wireless device of claim 1, wherein the display is updated to present a graphical presentation of an aggregated account balance from multiple accounts relative to an aggregated credit limit of the multiple accounts.

5. The wireless device of claim 1, wherein the account information comprises a running total of an account balance based on received transaction information describing purchases.

6. The wireless device of claim 1, wherein the transaction information comprises transaction identification information, transaction amount, and merchant name.

7. A non-transitory computer storage medium encoded with computer program instructions that when executed by one or more computers cause the one or more computers to perform operations comprising:
 receiving transaction information regarding a purchase and aggregated account information for a number of accounts of the user of the wireless device;
 determining account information for each of the number of accounts based on the selected transaction information and the aggregated account information; and
 updating a display with account information for the number of accounts of the consumer on the wireless device based on the sent selected transaction information and the determined account information, the display utilizing a color-coded representation wherein a first color is used to represent a first proximity of each of the number of accounts to a credit or balance limit for each of the number of accounts and a second color is used to represent a second proximity of each of the number of accounts to the credit or balance limit for each of the number of accounts, wherein the second proximity is closer to the credit or balance limit for each of the number of accounts than the first proximity.

8. The non-transitory computer storage medium of claim 7, wherein the transaction information is received via an SMS message.

9. The non-transitory computer storage medium of claim 7, wherein the account information includes aggregated account information and a current account balance and a credit limit of an account associated with the transaction information.

10. The non-transitory computer storage medium of claim 7, wherein updating the display comprises updating the display to present a graphical presentation of an aggregated account balance from multiple accounts relative to an aggregated credit limit of the multiple accounts.

11. The non-transitory computer storage medium of claim 7, wherein the account information comprises a running total of an account balance based on received transaction information describing purchases.

12. The non-transitory computer storage medium of claim 7, wherein the transaction information comprises transaction identification information, transaction amount, and merchant name.

13. A computer-implemented method comprising:
receiving, by a wireless device, transaction information regarding a purchase and aggregated account information for a number of accounts of the user of the wireless device;
determining account information for each of the number of accounts based on the selected transaction information and the aggregated account information; and
updating, by a wireless device, a display with account information for the number of accounts of the consumer on the wireless device based on the sent selected transaction information and the determined account information, the display utilizing a color-coded representation wherein a first color is used to represent a first proximity of each of the number of accounts to a credit or balance limit for each of the number of accounts and a second color is used to represent a second proximity of each of the number of accounts to the credit or balance limit for each of the number of accounts, wherein the second proximity is closer to the credit or balance limit for each of the number of accounts than the first proximity.

14. The computer-implemented method of claim 13, wherein the transaction information is received via an SMS message.

15. The computer-implemented method of claim 13, wherein the account information includes aggregated account information and a current account balance and a credit limit of an account associated with the transaction information.

16. The computer-implemented method of claim 13, wherein updating the display comprises updating the display to present a graphical presentation of an aggregated account balance from multiple accounts relative to an aggregated credit limit of the multiple accounts.

17. The computer-implemented method of claim 13, wherein the account information comprises a running total of an account balance based on received transaction information describing purchases.

18. The computer-implemented method of claim 13, wherein the transaction information comprises transaction identification information, transaction amount, and merchant name.

* * * * *